US00RE48153E

(19) United States
(12) Reissued Patent
Maruyama et al.

(10) Patent Number: US RE48,153 E
(45) Date of Reissued Patent: Aug. 11, 2020

(54) FIXING APPARATUS FOR FIXING TONER ONTO A SHEET

(71) Applicants: KABUSHIKI KAISHA TOSHIBA, Tokyo (JP); TOSHIBA TEC KABUSHIKI KAISHA, Tokyo (JP)

(72) Inventors: Shinji Maruyama, Shizuoka (JP); Takaho Watanabe, Shizuoka (JP); Kazuhiko Kikuchi, Kanagawa (JP)

(73) Assignees: KABUSHIKI KAISHA TOSHIBA, Tokyo (JP); TOSHIBA TEC KABUSHIKI KAISHA, Tokyo (JP)

(21) Appl. No.: 15/272,044

(22) Filed: Sep. 21, 2016

Related U.S. Patent Documents

Reissue of:
(64) Patent No.: 8,953,996
Issued: Feb. 10, 2015
Appl. No.: 14/151,293
Filed: Jan. 9, 2014

U.S. Applications:
(63) Continuation of application No. 13/041,342, filed on Mar. 4, 2011, now Pat. No. 8,644,746.

(60) Provisional application No. 61/312,053, filed on Mar. 9, 2010, provisional application No. 61/312,021, filed on Mar. 9, 2010, provisional application No. 61/312,030, filed on Mar. 9, 2010.

(51) Int. Cl.
*G03G 15/20* (2006.01)

(52) U.S. Cl.
CPC ..... *G03G 15/2053* (2013.01); *G03G 15/20* (2013.01); *G03G 15/2042* (2013.01)

(58) Field of Classification Search
None
See application file for complete search history.

(56) References Cited

U.S. PATENT DOCUMENTS

| | | | | |
|---|---|---|---|---|
| 7,319,840 | B2 * | 1/2008 | Matsumoto | G03G 15/2053 399/330 |
| 7,844,208 | B2 * | 11/2010 | Hayashi et al. | G03G 15/2025 399/329 |
| 7,925,198 | B2 | 4/2011 | Urano | G03G 15/206 399/333 |
| 8,204,419 | B2 * | 6/2012 | Urano | G03G 15/2064 399/328 |
| 2002/0118982 | A1 | 8/2002 | Fuma | G03G 15/2042 399/329 |

(Continued)

FOREIGN PATENT DOCUMENTS

CN 101609294 A 12/2009

*Primary Examiner* — Glenn K Dawson
(74) *Attorney, Agent, or Firm* — Kim & Stewart LLP

(57) ABSTRACT

A fixing apparatus according to an embodiment includes: a first roller; a second roller that forms a nip between the second roller and the first roller and presses a sheet passing through the nip against the first roller; a heater that heats at least one of the first roller and the second roller, a heating range of the heater being greater than a maximum printing width of a predetermined maximum sheet width, and a heat-uniformizing member that distributes heat of the heater along a longitudinal direction thereof, an effective length of the heat-uniformizing member in the longitudinal direction being the same as, or greater than, the predetermined maximum sheet width.

11 Claims, 10 Drawing Sheets

(AMENDED)

(56) References Cited

U.S. PATENT DOCUMENTS

| | | | | |
|---|---|---|---|---|
| 2007/0059062 | A1 | 3/2007 | Endo et al. | G03G 15/2042 399/329 |
| 2008/0013995 | A1 | 1/2008 | Kubota et al. | |
| 2008/0289717 | A1 | 11/2008 | Isayama et al. | |
| 2009/0052955 | A1 | 2/2009 | Tatematsu et al. | G03G 15/205 399/329 |
| 2009/0067899 | A1 | 3/2009 | Kikuchi | G03G 15/2053 399/328 |
| 2009/0232535 | A1* | 9/2009 | Tsueda et al. | G03G 15/2039 399/69 |
| 2009/0245902 | A1 | 10/2009 | Gon et al. | G03G 15/2064 399/331 |
| 2009/0297197 | A1* | 12/2009 | Hase | G03G 15/2042 399/69 |
| 2009/0324272 | A1 | 12/2009 | Barton et al. | G03G 15/2042 399/69 |
| 2010/0034568 | A1 | 2/2010 | Sone et al. | G03G 15/2042 399/331 |
| 2011/0070006 | A1 | 3/2011 | Sone et al. | G03G 15/2039 399/333 |
| 2011/0097098 | A1 | 4/2011 | Tsukioka | G03G 15/2039 399/69 |
| 2011/0222933 | A1 | 9/2011 | Maruyama et al. | G03G 15/2042 399/329 |

* cited by examiner

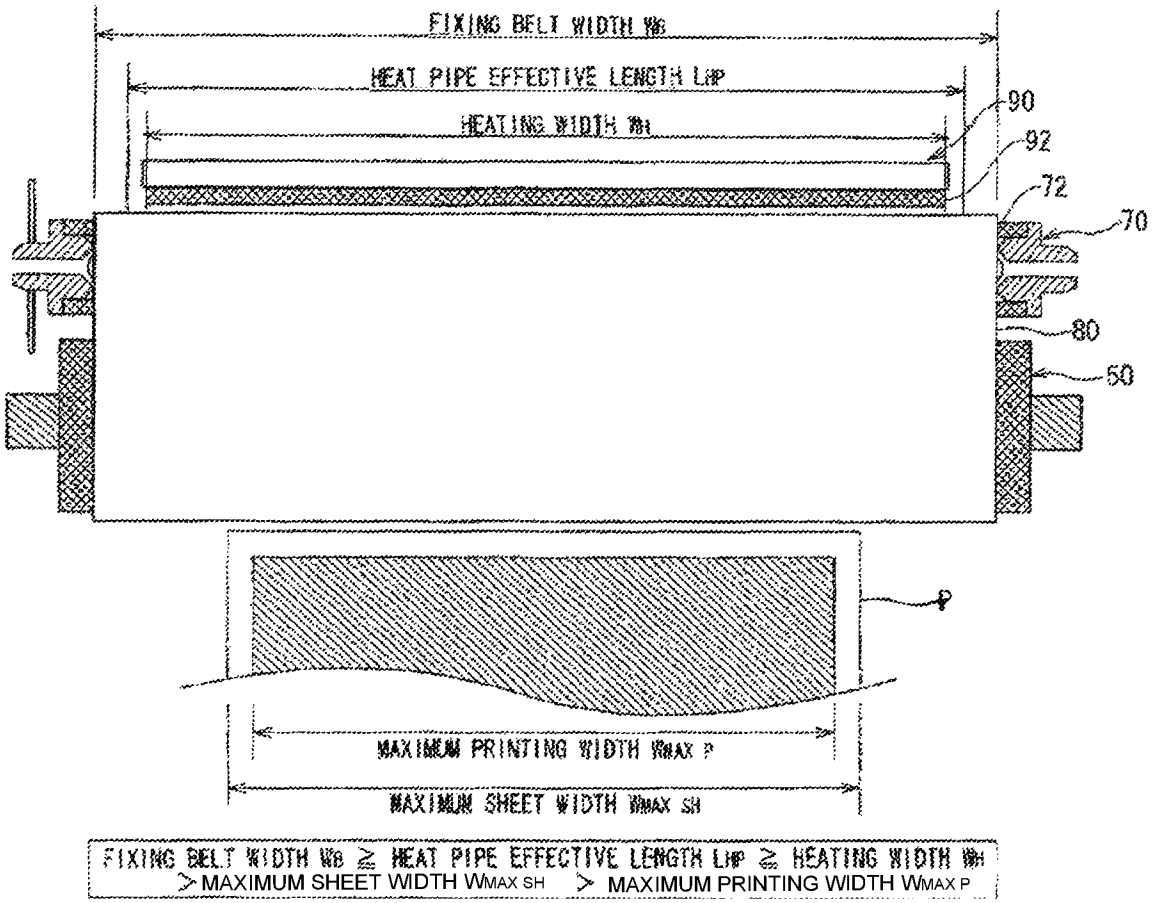
FIG. 6
(AMENDED)

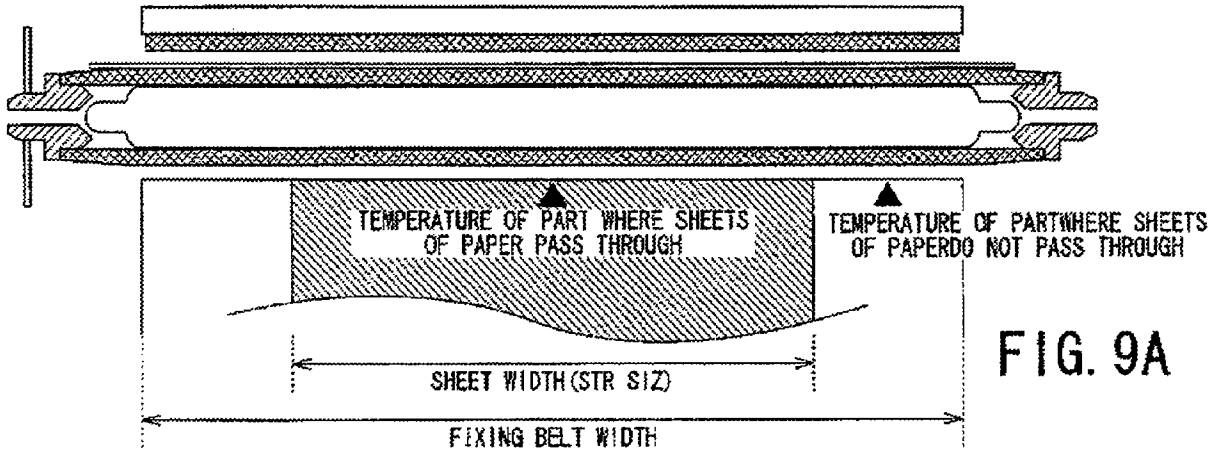

FIG. 9A

TEMPERATURE OF PART WHERE SHEETS OF PAPER PASS THROUGH AND PART WHERE SHEETS OF PAPER DO NOT PASS THROUGH (WHEN 1,000 SHEETS PASS THROUGH)

| | TEST A | TEST B | TEST C | TEST D |
|---|---|---|---|---|
| CONDITION OF HEAT-UNIFORMIZING ROLLER | WITHOUT HEAT PIPE | WITH HEAT PIPE | | |
| | PFA TUBE (THICKNESS50 μm) | PFA TUBE (THICKNESS50 μm) | FLUORORESIN COATING (FILLING STANDARD AMOUNT OF FILLER) | FLUORORESIN COATING (FILLING LARGER AMOUNT THAN STANDARD AMOUNT OF FILLER) |
| TEMPERATURE OF PART WHERE SHEETS OF PAPER PASS THROUGH | 175℃ | 180℃ | 179℃ | 178℃ |
| TEMPERATURE OF PART WHERE SHEETS OF PAPER DO NOT PASS THROUGH | 280℃ | 238℃ | 225℃ | 212℃ |
| THE NUMBER OF WAITS DURING A PERIOD WHEN 1,000 SHEETS PASS THROUGH | — (OPERATION STOPPED DUE TO HIGH-TEMPERATURE ANOMALY) | 50 TIMES | 3 TIMES | 0 TIMES |

FIG. 9B

CONDITION: SHEET SIZE: STR
GRAMMAGE: 105g/m2
SPEED 75cpm

FIXING APPARATUS FOR FIXING TONER ONTO A SHEET

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation of U.S. patent application Ser. No. 13/041,342, filed Mar. 4, 2011, which claims benefit of U.S. provisional patent applications: Ser. No. 61/312,053 filed on Mar. 9, 2010; Ser. No. 61/312,021 filed Mar. 9, 2010; and Ser. No. 61/312,030 filed on Mar. 9, 2010, the entire contents of each of the aforementioned patent applications are incorporated herein by reference.

FIELD

Embodiments described herein relate generally to a fixing apparatus.

BACKGROUND

In image forming apparatuses which use an electrophotographic method, such as, copying machines, printers, and MFPs (Multi-Function Peripheral), a fixing apparatus is used for fixing transferred toner onto a sheet.

For example, the fixing apparatus heats and pressurizes the sheet passing through a nip formed between two rollers thereby fixing the toner onto the sheet. Of the two rollers, the roller that mainly heats the sheet is called a fixing roller (or a heating roller), and the roller that mainly pressurizes the sheet is called a pressurizing roller. In addition, there are many configurations in which a belt called a fixing belt is provided separately from the fixing roller so that the fixing belt is interposed at the nip between the fixing roller and the pressurizing roller. In this configuration, the sheet to be fixed passes through a nip between the fixing belt and the pressurizing roller.

In the configuration having the fixing belt, not the fixing roller but the fixing belt is directly heated by a heater. As heat of the heated fixing belt is transferred to the sheet, the toner is fixed onto the sheet. During the fixing, since the heat of the fixing belt is lost to the sheet, the temperature of a portion of the fixing belt which comes in contact with the sheet is temporarily reduced.

Sizes of the sheets to be fixed are not always definite. Various sizes of sheets may be mixed. For example, there may be a case where immediately after a sheet with A4 size is fixed, a sheet with A3 size is fixed. In this case, immediately after the fixing of the A4 sheet, in the rotation shaft direction of the fixing roller, that is, in the width direction of the fixing belt, even though the temperature of a region corresponding to the A4 size width is reduced, the temperatures of both the side regions are maintained at a high temperature. That is, non-uniformity of temperature occurs in the width direction of the fixing belt. Therefore, if fixing of the A3 size sheet is subsequently performed in this state, the center portion is fixed at a low temperature, and conversely both end portions are fixed at a high temperature, such that the fixing state becomes non-uniform in the width direction of the sheet (in a direction perpendicular to a carriage direction).

Therefore, in order to solve the problem, a fixing apparatus which can always maintain uniformity of heat in the width direction of a fixing belt even when the temperature of the fixing belt in the width direction is partially reduced, so as to immediately return the temperature to the entirely uniform temperature is desirable.

DESCRIPTION OF THE DRAWINGS

FIG. 6 is a diagram for explaining a magnitude relationship between lengths of components of the fixing apparatus in the longitudinal axial direction and widths of sheets.

FIG. 9A is an explanatory view of evaluation tests of the fixing apparatus according to the second embodiment, and FIG. 9B is a table showing the evaluation test result.

DETAILED DESCRIPTION

Exemplary embodiments of a fixing apparatus will be described with reference to the accompanying drawings.

A fixing apparatus according to an embodiment includes: a first roller; a second roller that forms a nip between the second roller and the first roller and presses a sheet passing through the nip against the first roller; a heater that heats at least one of the first roller and the second roller, a heating range of the heater being greater than a maximum printing width of a predetermined maximum sheet width, and a heat-uniformizing member that distributes heat of the heater along a longitudinal direction [thereof] *of the heat-uniformizing member*, an effective length of the heat-uniformizing member in the longitudinal direction being the same as, or greater than, the predetermined maximum sheet width.

(1) Image Forming Apparatus

Figure 1:
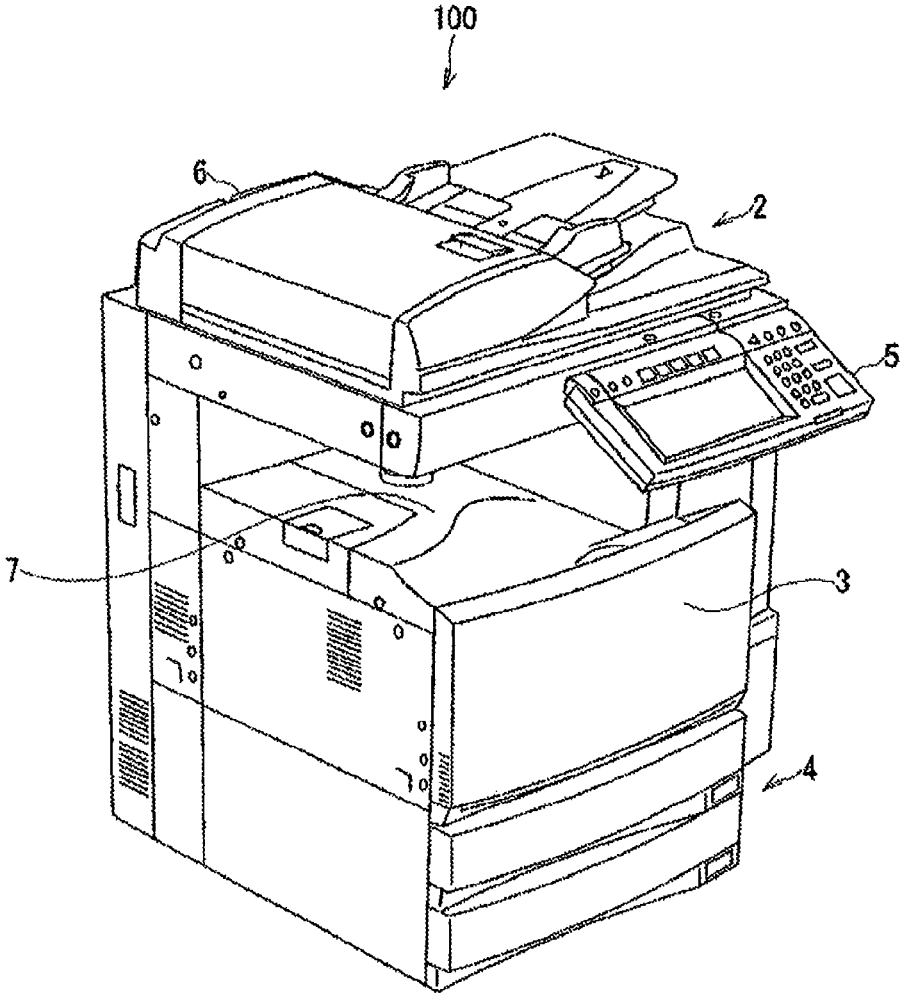
FIG. 1 is a diagram illustrating an example of the outer appearance of an image forming apparatus including a fixing apparatus according to a first embodiment.

FIG. 1 is a diagram illustrating an example of the outer appearance of a copying machine (or an MFP (Multi-Function Peripheral)) as a typical example of an image forming apparatus 100 including a fixing apparatus 40 according to an embodiment.

The image forming apparatus 100 has an image reading apparatus 2, an image forming unit 3, a paper feeding unit 4, an operation unit 5, and the like.

The image reading apparatus 2 generates image data by optically reading an original document placed on a platen or an original document input by an ADF 6 (Auto document Feeder).

The image forming unit 3 prints the image data on a sheet supplied from the paper feeding unit 4 using an electrophotographic method. The printed sheet is discharged to a paper discharge tray 7 so as to be stacked.

The operation unit 5 is provided with a display unit or various operation buttons as a user interface.

Figure 2:
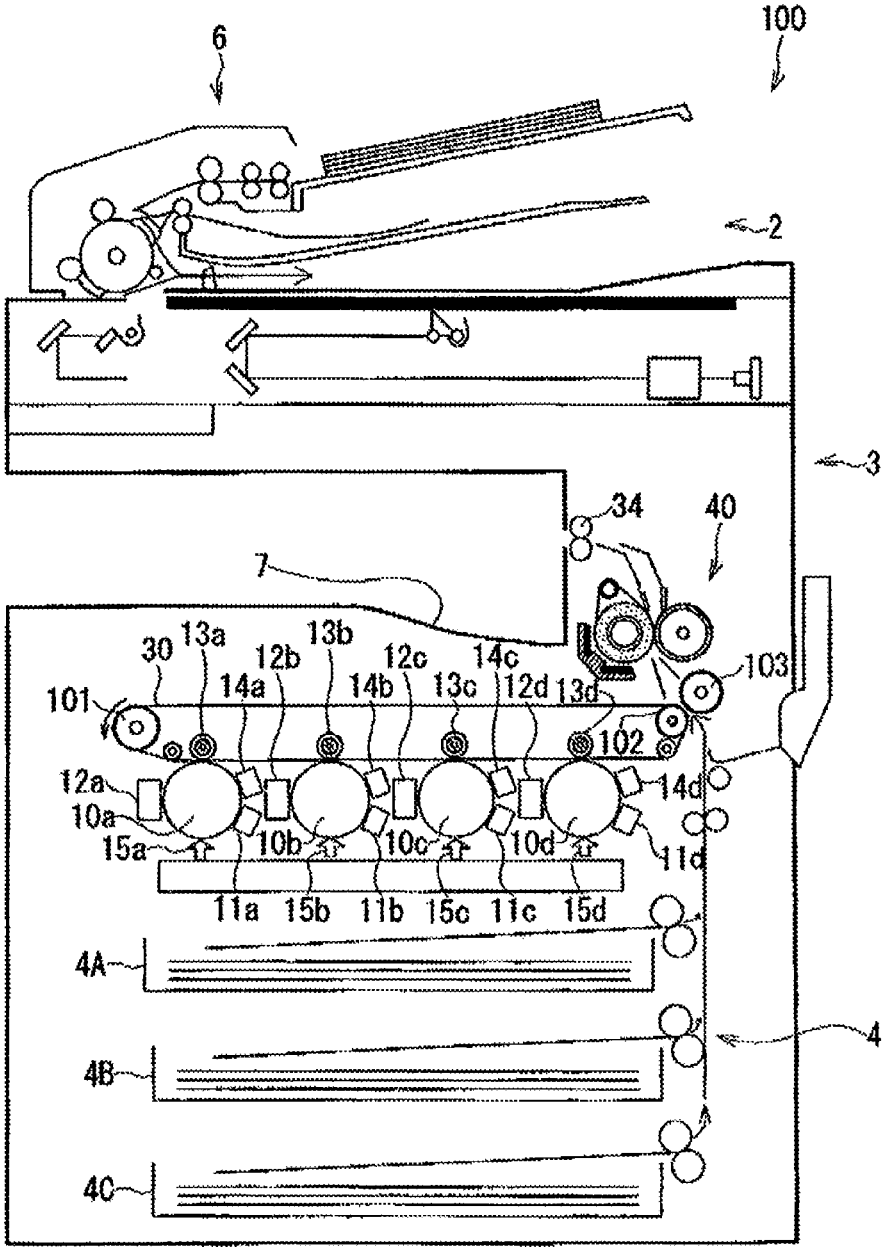
FIG. 2 is a cross-sectional view illustrating an example of the internal configuration of the image forming apparatus.

FIG. 2 is a schematic cross-sectional view illustrating an example of the internal configuration of the image forming apparatus 100. The image forming apparatus 100 is configured to enable color printing using, for example, a tandem-type electrophotographic method.

As illustrated in FIG. 2, four photoconductive drums 10a to 10d corresponding to four colors of yellow (Y), magenta (M), cyan (C), and black (K) are arranged in parallel along a carriage direction of a transfer belt 30. In the vicinities of the photoconductive drums 10, charging devices 11a to 11d, developing devices 12a to 12d, transfer rollers 13a to 13d, cleaners 14a to 14d, and the like are respectively disposed in the order from the upstream side to the downstream side of rotation. Here, alphabetic characters a, b, c, and d attached to the reference numerals of the components respectively correspond to print colors Y, M, C, and K.

The surfaces of the photoconductive drums 10a to 10d are uniformly charged at a predetermined potential by the charging devices 11a to 11d. Thereafter, laser beams 15a to 15d subjected to pulse-width modulation according to the levels of the image data including the Y, M, C, and K colors illuminate the surfaces of the photoconductive drums 10a to 10d for the respective colors. With the illumination of the laser beams 51a to 51d, potentials of the illuminated portions are reduced, such that electrostatic latent images are formed on the surfaces of the photoconductive drums 10a to 10d.

The developing devices 12a to 12d develop the electrostatic latent images on the photoconductive drums 10a to 10d using the respective colors of toner. By the development, toner images of the Y, M, C, and K colors are formed on the respective photoconductive drums 10a to 10d.

On the other hand, the transfer belt 30 is stretched over a driving roller 101 and a secondary transfer opposed roller 102 in a loop shape and is continuously rotated by driving the driving roller 101 in a direction shown by an arrow.

While the transfer belt 30 passes through each of the nips formed between the photoconductive drums 10a to 10d and the respective transfer rollers 13a to 13d, the toner images of the Y, M, C, and K colors are sequentially transferred on the outer peripheral surface of the transfer belt 30.

First, at a position where the photoconductive drum 10a for the Y color and the transfer roller 13a for the Y color are opposed to each other (a Y transfer position), the Y toner image is transferred onto the transfer belt 30 from the photoconductive drum 10a.

Next, at a position where the photoconductive drum 10b for the M color and the transfer roller 13b for the M color are opposed to each other (an M transfer position), the M toner image is transferred onto the transfer belt 30 from the photoconductive drum 10b. Here, the M toner image is transferred so as to overlap with the position of the Y toner image already transferred onto the outer peripheral surface of the transfer belt 30.

Thereafter, in the same manner, the C toner image and the K toner image are sequentially transferred and overlapped onto the outer peripheral surface of the transfer belt 30, thereby forming a full-color toner image on the transfer belt 30. The full-color toner image reaches a nip formed between a secondary transfer roller 103 and the secondary transfer opposed roller 102 (a secondary transfer position) as the transfer belt 30 is moved.

On the other hand, a sheet picked up from one cassette from among paper feeding cassettes 4A, 4B, and 4C of the paper feeding unit 4 is carried to the secondary transfer position. At the secondary transfer position, the full-color toner image on the transfer belt 30 is transferred onto the sheet. The full-color toner image is fixed onto the sheet heated and pressurized by the fixing apparatus 40. Thereafter, the sheet is discharged to the paper discharge tray 7 by a paper discharge roller 34.

The toner remaining on the surfaces of the photoconductive drums 10a to 10d after finishing transfer onto the transfer belt 30 is removed by the cleaners 14a to 14d for preparation for printing of a subsequent sheet. By repeating the above processes, full-color printing can be continuously performed.

When monochrome printing is performed, a K toner image is transferred onto the transfer belt 30 only by the photoconductive drum 10d and the transfer roller 13d for the K color, and the photoconductive drums 10a to 10c and the transfer rollers 13a to 13c for the Y, M, and C colors are not used.

(2) Fixing Apparatus According to First Embodiment

Figure 3:
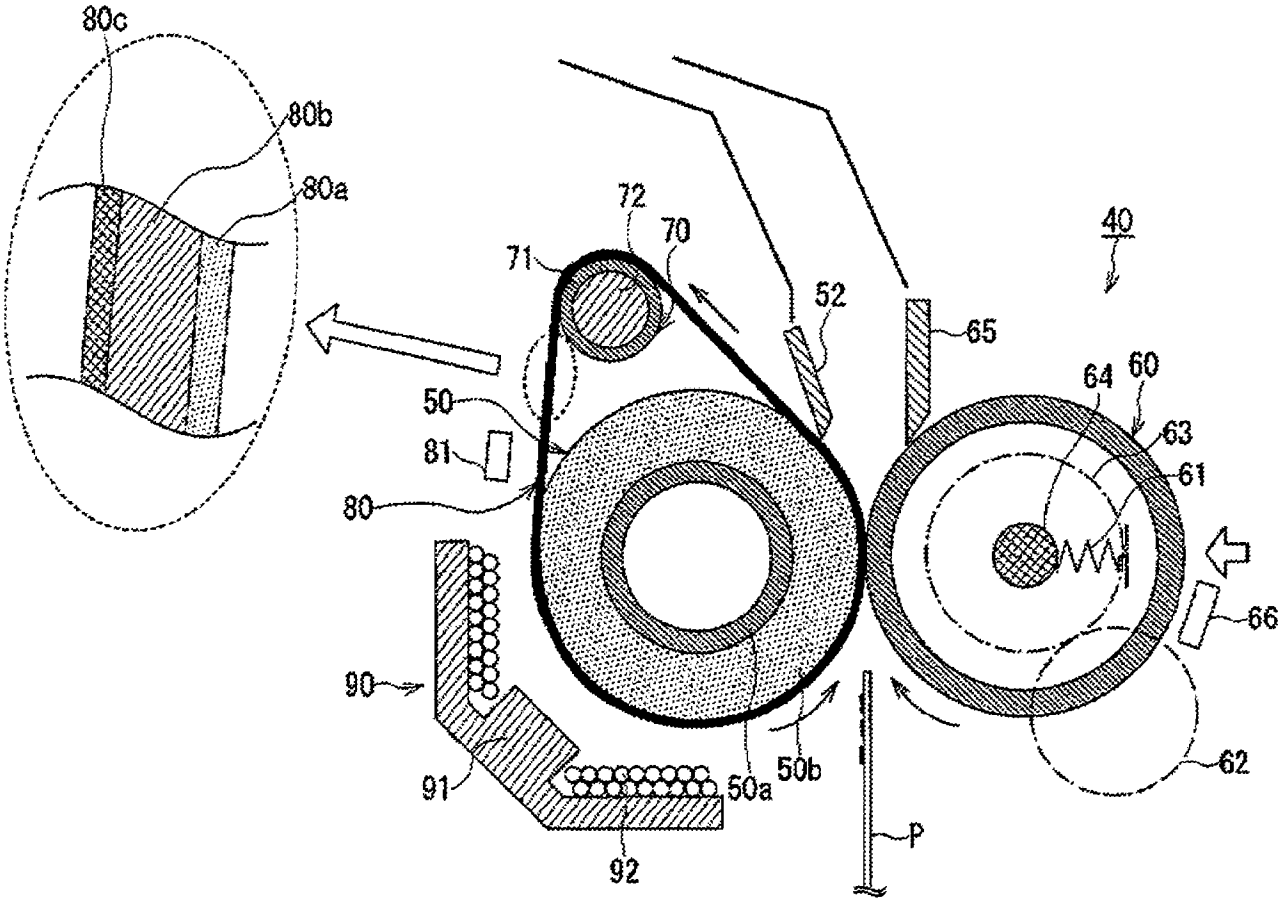
FIG. 3 is a cross-sectional view illustrating an example of the configuration of the fixing apparatus according to the first embodiment.
Figure 4:
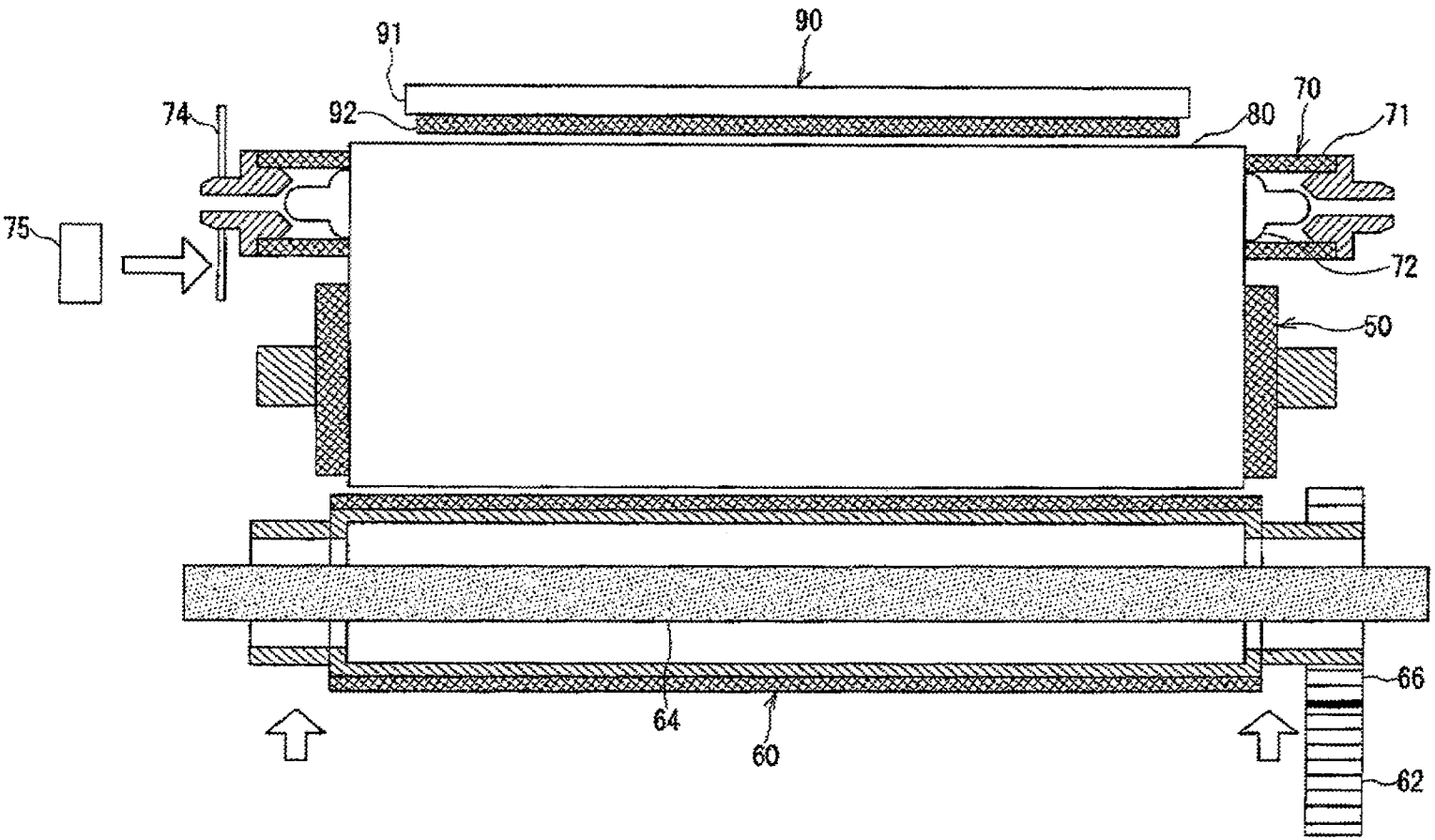
FIG. 4 is a development view illustrating the example of the configuration of the fixing apparatus according to the first embodiment in a longitudinal axial direction thereof.

FIG. 3 is a schematic cross-sectional view illustrating an example of the entire configuration of the fixing apparatus 40 used for the image forming apparatus 100. FIG. 4 is a schematic development view illustrating the fixing apparatus 40 in a longitudinal direction thereof.

The fixing apparatus 40 has a fixing roller 50 (first roller), a pressurizing roller 60 (second roller), a heat-uniformizing roller 70 (third roller), a fixing belt 80, and a heater 90. The fixing roller 50 has a diameter of, for example, ϕ 48.5 mm, the pressurizing roller 60 has a diameter of, for example, ϕ 50 mm, and the heat-uniformizing roller 70 is a roller having a diameter of, for example, ϕ 17 mm.

The pressurizing roller 60 is driven in the arrow direction by a driving motor (not shown). The fixing roller 50, the heat-uniformizing roller 70, and the fixing roller 80 are rotated in their respective arrow directions following the pressurizing roller 60. In addition, the pressurizing roller 60 comes in pressure contact with the fixing roller 50 by a pressurizing mechanism 61, and is maintained to have a predetermined nip width between the pressurizing roller 60 and the fixing roller 50. The fixing belt 80 is pulled between the fixing roller 50 and the heat-uniformizing roller 70 at a predetermined tension by a tension mechanism.

The fixing roller 50 has a two-layer structure including a core pipe 50a and a foamed rubber (sponge) 50b from the inside. In this embodiment, for example, the thickness of the core pipe 50a is 2 mm, and the thickness of the foamed rubber 50b is 8.5 mm.

The fixing belt 80 has a three-layer structure including a metal electrical conductive layer 80a, a solid rubber layer 80b, and a releasing layer 80c from the inside. In this embodiment, as the material of the metal electrical conductive layer 80a, nickel having a thickness of 40 μm is used. As the material of the metal electrical conductive layer 80a, as well as nickel, stainless steel, aluminum, a composite material of stainless steel and aluminum may also be employed. In addition, in this embodiment, silicone rubber having a thickness of 200 μm is used for the solid rubber layer 80b, and a PFA (tetrafluoroethylene-perfluoroalkyl vinyl ether copolymer) tube having a thickness of 30 μm is used for the releasing layer 80c.

The pressurizing roller 60 is configured by coating silicone rubber, fluoro-rubber, and the like around the core pipe. In addition, the pressurizing roller 60 has a halogen lamp 64 embedded therein.

The heat-uniformizing roller 70 has a metal pipe (roller main body) 71 and a shaft-like heat-uniformizing member embedded in the metal pipe 71. The heat-uniformizing member is preferably a heat pipe 72. In addition, a releasing layer is formed on the surface of the metal pipe 71. In this embodiment, iron is used as the material of the metal pipe 71; however, aluminum, copper, stainless steel, and the like may also be employed.

A fixing driving motor (not shown) drives a gear 63 disposed at an axial end portion of the pressurizing roller 60 via the driving gear 62, thereby driving the pressurizing roller 60. The pressurizing roller 60 further drives the fixing belt 80 and the fixing roller 50 which are in contact thereto with the nip.

When a sheet P passes through the nip between the fixing roller 50 and the pressurizing roller 60 with the fixing belt 80, toner transferred onto the sheet P is fused and pressure-bonded by heat of the fixing belt 80 and pressure applied by the pressurizing roller 60, thereby fixing the toner onto the sheet P.

On the downstream side of the nip of the fixing belt 80, a separation plate 52 for separating the sheet P from the fixing roller 50 is provided. The position of the separation plate 52 is adjusted to have a predetermined gap from the fixing belt 80 so as to separate the sheet P without being in contact with the fixing belt 80. In addition, on the downstream side of the nip of the fixing belt 80, a separation plate 65 for separating the sheet P from the pressurizing roller 60 is also provided.

At a predetermined position in the longitudinal direction of the fixing belt 80, a non-contact temperature sensor 81 is disposed as a temperature sensing unit. The non-contact temperature sensor 81 is, for example, configured as a thermopile that detects infrared rays. The temperature of the fixing belt 80 is detected by the non-contact temperature sensor 81 so as to control the temperature of the fixing belt 80.

The heater 90 is disposed at a predetermined position of the outer periphery of the fixing belt 80 so as to heat the fixing belt 80 by electromagnetic induction. The heater 90 includes a magnetic core 91 and a coil 92 wound around the magnetic core 91.

Since the magnetic core 91 is included, a sufficient magnetic flux can be generated by the coil 92 even with a small number of turns. In addition, the magnetic core 91 has a bent shape at the center portion along the arc shape of the fixing roller 50. Due to this shape, the magnetic flux can be concentrated onto the fixing belt 80 on the fixing roller 50 so as to be locally concentrated on the metal conductive layer 80a (nickel layer) of the fixing belt 80 for induction heating. The fixing belt 80 heated by the heater 90 by electromagnetic induction applies heat to the sheet P at the nip between the fixing roller 50 and the pressurizing roller 60.

On the other hand, the pressurizing roller 60 has the halogen lamp 64 embedded therein, and the pressurizing roller 60 is heated from the inside by the halogen lamp 64. Heat is applied to the sheet P also by the heated pressurizing roller 60. A temperature detection element 66 is disposed for temperature control on the outer periphery of the pressurizing roller 60. The temperature detection element 66 is configured as, for example, a non-contact thermistor.

Three separated blades 74 are mounted to an end portion of the heat-uniformizing roller 70 for detecting rotation as illustrated in FIG. 4. In addition, a reflective sensor 75 is disposed to approach the blades 74. The reflective sensor 75 is turned on and off three times whenever the blade 74 is rotated once. When the fixing belt 80 is stopped (that is, the rotation of the heat-uniformizing roller 70 is stopped), one point in the fixing belt 80 is intensively and excessively heated. Therefore, by detecting the rotation stop of the heat-uniformizing roller 70 using the reflective sensor 75, excessive heating of the fixing belt 80 is prevented in advance.

Figure 5:
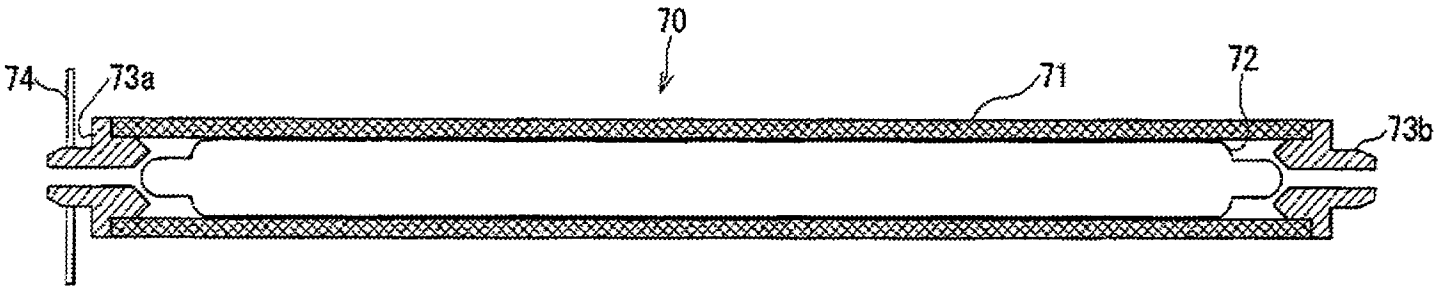
FIG. 5 is a cross-sectional view illustrating an example of the configuration of a heat-uniformizing roller in a longitudinal axial direction thereof.

FIG. 5 is a cross-sectional view of the heat-uniformizing roller 70 in a longitudinal axial direction thereof. The heat-uniformizing roller 70 has the heat pipe 72 disposed inside the metal pipe 71 made of iron, and to both end portions thereof, supporting members 73a and 73b are press-fitted. The heat pipe 72 includes an operating fluid (pure water) in an outer pipe made of copper and is sealed after pressure reduction.

After the metal pipe 71 is inserted into the heat pipe 72, the supporting members 73a and 73b are press-fitted. Thereafter, by heating the metal pipe 71 and the heat pipe 72 at 300 to 350° C. for 30 to 60 minutes, the heat pipe 72 undergoes plastic deformation due to thermal expansion, and thus is fixed to the inner peripheral surface of the metal pipe 71 by shrink fitting.

Figures 7A, 7B:
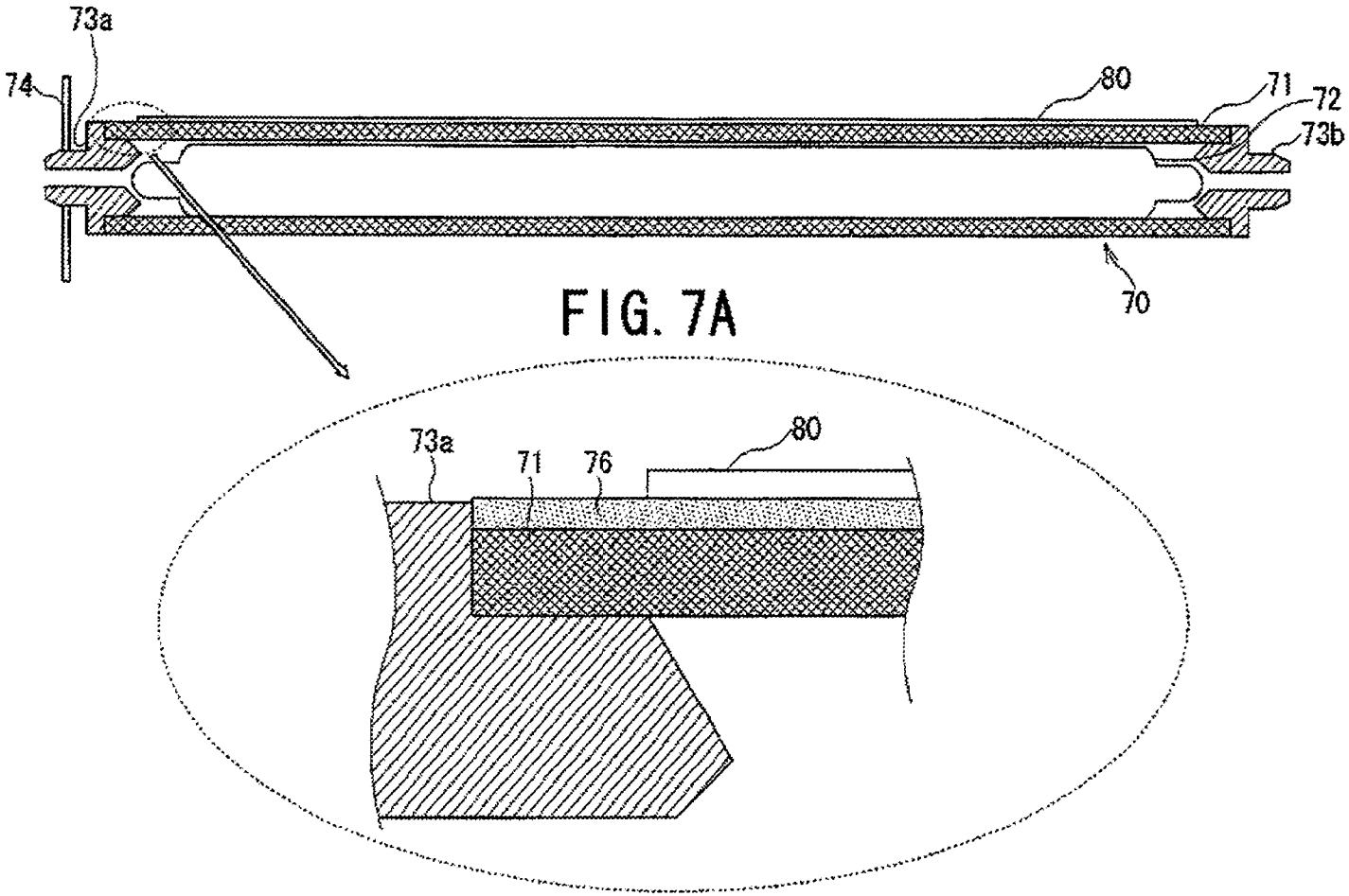
FIG. 7A is a cross-sectional view of the heat-uniformizing roller used for the fixing apparatus according to the first embodiment.
FIG. 7B is an enlarged view of an end portion thereof.

Thereafter, the metal pipe 71 is polished so that the outer appearance dimensions have predetermined values, and a releasing layer 76 is formed on the surface of the resultant (see FIG. 7B).

FIG. 6 is a diagram showing a magnitude relationship between a fixing belt width $W_B$, a heat pipe effective length $L_{HP}$, a heating width $W_H$, a maximum sheet width $W_{MAX}$ H, and a maximum printing width $W_{MAX\,P}$ in this embodiment. The fixing belt width $W_B$ is a width of the fixing belt 80 (a length of the fixing belt 80 in a direction perpendicular to its movement direction). The heat pipe effective length $L_{HP}$ is a length of the heat pipe 72 effective in heat uniformization performance. Specifically, as illustrated in FIG. 6, the heat pipe effective length $L_{HP}$ is a length of a region of the outer peripheral surface of the heat pipe 72 being in contact with the inner peripheral surface of the metal pipe 71. The heating width $W_H$ is a heating range of the heater 90 in the width direction of the fixing belt 80 and is a length of the coil 91 in the longitudinal axial direction of the heater 90. The maximum sheet width $W_{MAX\,SH}$ is a width of a sheet with the maximum size that can be treated by the fixing apparatus 40 (a width of the sheet in a direction perpendicular to its carriage direction). The maximum printing width $W_{MAX\,P}$ is a maximum printing width for the sheet with the maximum size. Typically, since blanks with predetermined widths (for example, 5 mm) are provided on the upper, lower, left, and right sides of a print sheet, the maximum printing width is set to be smaller than the sheet width.

As described above, the heater 90 heats the fixing belt 80, and the fixing belt 80 heats the toner on the sheet P so as to fix the toner onto the sheet P. Since the heat of the fixing belt 80 immediately after the fixing is lost to the sheet P, the temperature of a region of the fixing belt 80 in the width direction corresponding to the width of the sheet P is reduced, whereas the temperature of regions on the outsides of the width of the sheet P is not lost and thus is maintained at a higher temperature. Therefore, the temperature distribution of the fixing belt 80 in the width direction becomes non-uniform. The heat pipe 72 is used as a heat-uniformizing means for uniformizing the non-uniform temperature distribution within a short time. That is, the heat of the high-temperature portion of the fixing belt 80 (the region on the outsides in the width direction) is transferred to the low-temperature region (the region through which the sheet P passes) in this moment, thereby achieving heat uniformization of the fixing belt 80 in the width direction. Due to the heat uniformization, even when a sheet with a wide width is fixed immediately after a sheet with a narrow width is fixed, the sheet can be uniformly fixed in the width direction.

The magnitude relation between the fixing belt width $W_B$, the heat pipe effective length $L_{HP}$, the heating width $W_H$, the maximum sheet width $W_{MAX\ SH}$, and the maximum printing width $W_{MAX\ P}$ is very important in terms of reliable heat transfer and uniform fixing performance during the heat transfer as described above.

On the other hand, power consumption of the heater 90 accounts for a high proportion of the overall power consumption of the image forming apparatus 100. Therefore, in terms of power saving, unnecessary heating by the heater 90 needs to be avoided stoutly. From this point of view, in the fixing apparatus 40 according to this embodiment, the magnitude relation between the fixing belt width $W_B$, the heat pipe effective length $L_{HP}$, the heating width $W_H$, the maximum sheet width $W_{MAX\ SH}$, and the maximum printing width $W_{MAX\ P}$ is set as follows.

(a) In terms of heat uniformization, the heat pipe effective length $L_{HP}$ is set to be the same as or greater than the maximum sheet width $W_{MAX\ SH}$. If the heat pipe effective length $L_{HP}$ is smaller than the maximum sheet width $W_{MAX\ SH}$, when the vicinities of both the ends of the maximum sheet width $W_{MAX\ SH}$ have a high temperature, heat of the high-temperature portion is not transferred to the low-temperature portion, and the heat distribution of the fixing belt 80 becomes non-uniform, so that fixing performance of the sheet having the maximum sheet width $W_{MAX\ SH}$ is deteriorated.

(b) In terms of heat uniformization, the heat pipe effective length $L_{HP}$ is set to be the same as or greater than the heating width $W_H$ of the heater 90. As described below, in terms of power saving, the fixing belt width $W_B$ is set to be greater than the heating width $W_H$ of the heater 90. Accordingly, a region of the fixing belt 80 corresponding to the heating width $W_H$ of the heater 90 is heated. If the heat pipe effective length $L_{HP}$ is smaller than the heating width $W_H$ of the heater 90, the heat of both the ends of the fixing belt 80 heated by the heater 90 cannot be transferred to the center, and thus heat uniformization is disrupted.

(c) In terms of power saving, the heat pipe effective length $L_{HP}$ is set to be the same or smaller than the fixing belt width $W_B$. If the heat pipe effective length $L_{HP}$ is greater than the fixing belt width $W_B$, heat of the fixing belt 80 is transferred to both end portions of the heat pipe 72 outside the fixing belt 80, so that the temperature of the fixing belt 80 is substantially uniformly reduced in the width direction. Therefore, in order to compensate for the temperature reduction, extra heating by the heater 90 is needed.

(d) In terms of power saving, the heating width $W_H$ of the heater 90 is set to the same as or smaller than the fixing belt width $W_B$ (in other words, the fixing belt width $W_B$ is set to be greater than the heating width $W_H$). If the heating width $W_H$ of the heater 90 is greater than the fixing belt width W.sub.B, both end regions thereof that do not contribute to heating the fixing belt 80 exist in the heater 90, and thus power is unnecessarily consumed by the heater 90.

(e) In terms of reliable fixing of the toner onto the sheet, the heating width $W_H$ of the heater 90 is set to be the same or greater than the maximum printing width $W_{MAX\ P}$. As described above, the fixing belt width $W_B$ is greater than the heating width $W_H$, and the region of the fixing belt 80 corresponding to the heating width $W_H$ is a region that enables fixing. Accordingly, if the heating width $W_H$ of the heater 90 is smaller than the maximum printing width $W_{MAX\ P}$, a printing region that cannot be heated is remained, resulting in deterioration of fixing performance.

(f) In terms of ensuring sheet quality, the fixing belt width $W_B$ is set to be greater than the maximum sheet width $W_{MAX\ SH}$. If the fixing belt width $W_B$ is smaller than the maximum sheet width $W_{MAX\ SH}$, deformation of the sheet P is caused by a height difference between the fixing belt 80 and the fixing roller 50 when the sheet P passes through the nip.

In the fixing apparatus 40 according to this embodiment, it is possible to achieve both good fixing performance and power saving by prescribing the magnitude relation using the dimensions of the components.

(3) Fixing Apparatus According to Second Embodiment

As described above, in the heat-uniformizing roller 70, after the heat pipe 72 is fixed to the metal pipe 71 by shrink fitting, the metal pipe 71 is polished so that the outer appearances thereof have predetermined values, and a releasing layer 76 is formed on the surface of the resultant. The releasing layer 76 reduces friction between the fixing belt 80 and the metal pipe 71, thereby preventing unnecessary wrinkles of the fixing belt 80.

FIG. 7A is a diagram illustrating, as a comparative example to the second embodiment, the longitudinal axial cross-section of the heat-uniformizing roller 70 and the fixing belt 80 being in contact with the heat-uniformizing roller 70 according to the first embodiment. FIG. 7B is an enlarged view of an elliptical part (the metal pipe 71 of the heat-uniformizing roller 70, the releasing layer 76, and the fixing belt 80) of FIG. 7A.

In order to enhance heat uniformization performance of the heat-uniformizing roller 70, the fixing belt 80 has to be heated by the heat pipe 72 with good efficiency. Accordingly, the releasing layer 76 needs to be made of a material having a high thermal conductivity. In addition, in order to realize the high thermal conductivity, the releasing layer 76 needs to be thinned. Moreover, since the releasing layer 76 is in contact with the metal conductive layer 80a of the fixing belt 80, wear resistance is needed.

In the first embodiment, the PFA tube having a thickness of about 50 μm is used for the heat-uniformizing roller 70 to give importance to wear resistance. By inserting the metal pipe 71 into the PFA tube inside which an adhesive is applied, the releasing layer 76 is formed by the PFA tube. The releasing layer 76 by the PFA tube is excellent in wear resistance. However, since the thermal conductivity of the PFA tube itself is low, there is room for improvement in heat uniformization performance.

Figures 8A, 8B:
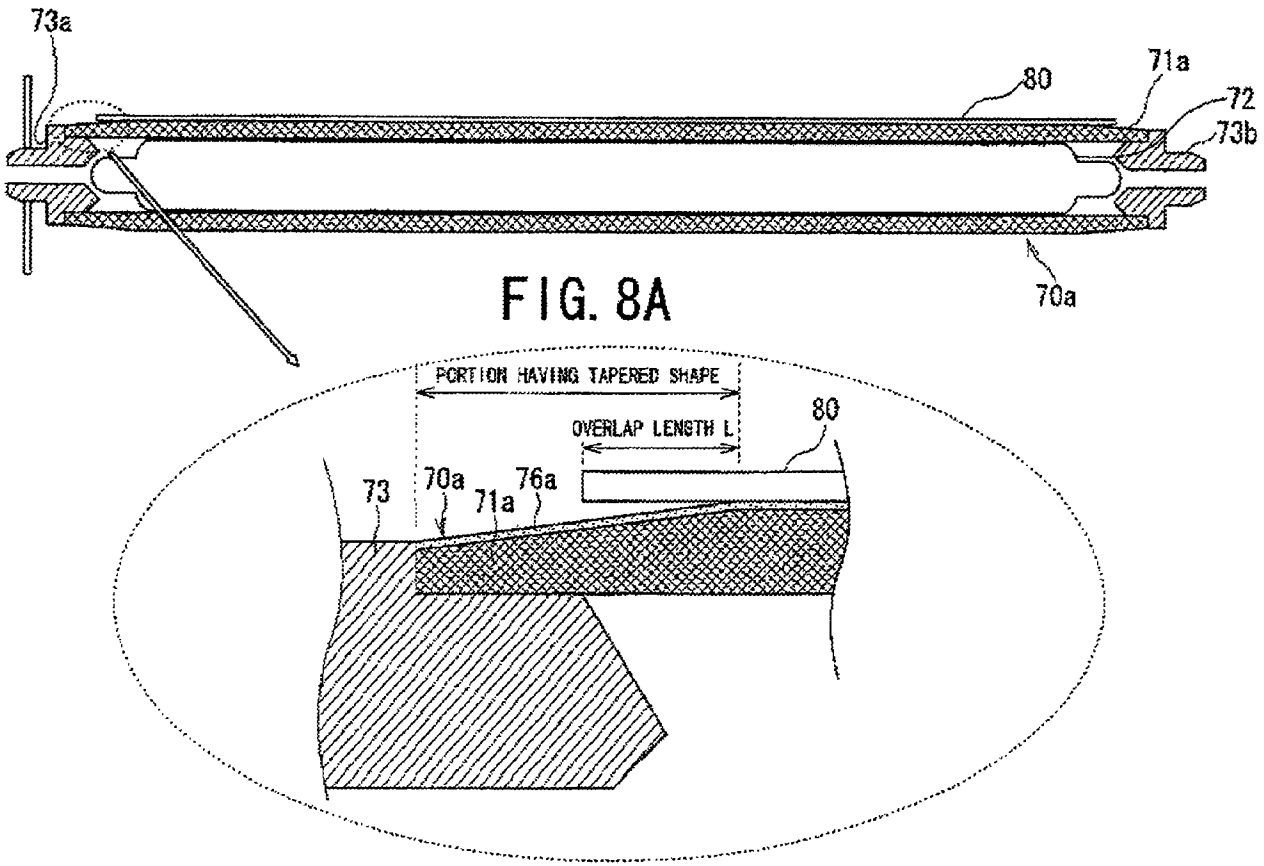
FIG. 8A is a cross-sectional view of a heat-uniformizing roller used for a fixing apparatus according to a second embodiment.
FIG. 8B is an enlarged view of an end portion thereof.

FIG. 8A is a diagram illustrating a longitudinal axial cross-section of a heat-uniformizing roller 70a according to the second embodiment and the fixing belt 80 being in contact with the heat-uniformizing roller 70a. FIG. 8B is an enlarged view of an elliptical part (a metal pipe 71a of the heat-uniformizing roller 70a, a releasing layer 76a, and the fixing belt 80) of FIG. 8A.

In the fixing apparatus 40 according to the second embodiment, the releasing layer 76a having an increased thermal conductivity and excellent wear resistance is formed as follows.

First, instead of inserting the metal pipe 71 into the tube, a fluororesin is baked on the metal pipe 71 to form a fluororesin, coating layer, so that the releasing layer 76a having a thickness of, for example, about 10 μm, which is thinner than that according to the related art, is obtained. By thinning the releasing layer 76a, higher thermal conduction performance than that according to the related art can be realized.

Second, in the case of the fluororesin coating, a filler such as carbon fibers can be filled in the fluororesin, and by filling the filler, the thermal conductivity of the coating layer (the releasing layer 76a) can be increased.

Last, a filling ratio of the filler is increased from the standard filling ratio. For example, by increasing the filling ratio three times the standard filling ratio, the thermal conductivity of the coating layer (the releasing layer 76a) can further be increased.

Typically, when a fluororesin coating layer is formed on a typical product, baking is generally performed at a temperature of about 400° C. However, the heat-uniformizing roller 70 has distinctiveness in that the heat-uniformizing roller 70 has to be baked while having the heat pipe 72 embedded therein. When the temperature is held at 400° C. or higher, the internal pressure of the heat pipe 72 is increased, so that there is a concern that the outer pipe of the heat pipe 72, which is made of copper, may be broken down. Therefore, as the fluororesin coating material used in the second embodiment, a material that can be baked at a temperature of 300° C. or less is preferable.

Evaluation tests for verifying effectiveness of the heat-uniformizing roller 70a according to the second embodiment were performed. The evaluation tests were performed under a condition of a fast printing speed. In addition, the tests were performed using sheets under strict conditions (sheets with small sheet widths and high grammages) in terms of the heat uniformization. Specifically, the printing speed was set to 75 cpm (copies per minute), and a sheet having a grammage of 105 g/m$^2$ and an STR size (STATEMENT R size having a sheet width of 139.7 mm), which has a narrow width, was used. In addition, when 1,000 sheets were passed through, temperatures of parts of the fixing belt 80 where sheets of paper did not pass through, and temperatures of parts thereof where sheets of paper passed through were measured. FIG. 9A illustrates a relation between, the width of the fixing belt 80 and the sheet widths used for the tests.

In addition, the number of waits and existence of operation stops due to high-temperature anomaly were evaluated during a period when 1,000 sheets passed through.

When the temperature of a predetermined position of the fixing belt 80 exceeds a predetermined threshold value (for example, 200° C.), heating of the heater 90 is temporarily stopped, and a reduction in the temperature of the fixing belt 80 is awaited. When the temperature is reduced by a certain degree, heating of the heater 90 is resumed, and this process is repeated. The number of temporary stops of the heater 90 is the number of waits.

On the other hand, when the temperature of the predetermined position of the fixing belt 80 exceeds a higher threshold value (for example, 230° C.), high-temperature anomaly is determined, and the operation of the image forming apparatus 100 is stopped. In this case, a maintenance agent is called for recovery from the anomaly.

The evaluation tests were performed on (Test A) a heat-uniformizing roller without a heat pipe embedded (a releasing layer: a PFA tube having a thickness of 50 μm), (Test B) a heat-uniformizing roller with a heat pipe embedded therein (a releasing layer: a PFA tube having a thickness of 50 μm), (Test C) a heat-uniformizing roller with a heat pipe embedded therein (a releasing layer: a fluororesin coating filled with a standard amount of filler and with a thickness of 10 μm), and (Test D) the heat-uniformizing roller 70a with the heat pipe embedded therein (the releasing layer: a fluororesin coating filled with filler at an amount of three times the standard amount and with a thickness of 10 μm). FIG. 9B is a table showing the evaluation results.

In (Test A) using the heat-uniformizing roller without the heat pipe 72 embedded, the temperature of the portion where the sheets of paper do not pass through was increased up to 280° C. which is an anomaly value, the high-temperature anomaly of the image forming apparatus 100 was determined, and the operation thereof was stopped.

By contrast, it was found that the operation stop of the image forming apparatus 100 due to the high-temperature anomaly is not caused by inserting the metal pipe 71 into the heat pipe 72 ((Test B) through (Test D)).

However, in (Test B) using the PFA tube according to the related art as the releasing layer, the temperature of the portion where the sheets of paper do not pass through was increased, and the number of waits was 50 and thus was high.

In contrast to this, in (Test C) using the heat-uniformizing roller in which the releasing layer was formed as the fluororesin coating filled with a standard amount of filler, the number of waits was reduced to 3 which is about ⅙ of (Test B).

Moreover, in (Test D) in which the filler filling ratio was set to three times the standard amount, it was found that the temperature of the end portion was reduced further lower, and thus there were no waits.

As such, it could be seen that by forming the releasing layer 76a of the fluororesin coating and moreover filling the coating with the filler including carbon fibers and the like, and increasing the filling ratio thereof to be higher than the standard value, the heat uniformization performance of the heat-uniformizing roller 70a was enhanced and an increase in temperature of the portion of the fixing belt 80 where the sheets of paper do not pass through was suppressed. In addition, as a result, it could be seen that the number of waits was zero or reduced significantly.

However, in general, it is said that the fluororesin coating is inferior in wear resistance to the PFA tube according to the related art. However, as the result of the evaluation tests, while it was found that slight wear was found in the edges of the fixing belt 80 and contact portions of the fluororesin coating layer, wear was rarely generated in regions other than the edges of the fixing belt 80.

In addition, it was found that the wear generated in the edges of the fixing belt 80 was caused by the heat-uniformizing roller 70 being bent by a tension load of the fixing bell 80, and stress concentration on the edges of the fixing belt 80 that occur as a result. Further, when a tension of about 100 N was applied to the fixing belt 80, the deflection amount thereof was about 0.3 mm.

Thus, according to the embodiment, the region of the heat-uniformizing roller 70a which approaches the end portion of the fixing belt 80 is formed in a tapered shape so that the rear surface of the edge of the fixing belt 80 is spaced from the surface of the heat-uniformizing roller 70a (see FIG. 8B).

Specifically, a tapered shape having a taper angle of equal to or higher than about 0.1 degrees, and preferably, equal to or higher than 0.05 degrees is provided in the end portion of the metal pipe 71. Due to the tapered shape, a contact between the edge of the fixing belt 80 and the releasing layer 76a can be avoided or reduced, so that wear of the releasing layer 76a by the fixing belt 80 can be prevented.

In addition, it is preferable that the length of the region where the region of the heat-uniformizing roller 70a having the tapered shape overlaps with the end portion of the fixing belt 80 in the rotation shaft direction of the heat-uniformizing roller 70a (the overlapping length in FIG. 8B) is longer than a maximum slip length (lateral displacement allowable amount) in the rotation shaft direction of the fixing belt 80. For example, when the taper angle is set to 0.1 degrees, the overlap length is about 10 mm.

As such, in the heat-uniformizing roller 70a of the fixing apparatus 40 according to the second embodiment, the releasing layer 76a is formed of the fluororesin coating filled with the filler, and thus high thermal conductivity can be realized, thereby enhancing the heat uniformization performance. In addition, by forming the end portion of the heat-uniformization roller 70a in the tapered shape, even when the fixing belt 80 slips in the width direction, a gap between the end portion of the fixing belt 80 and the heat-uniformizing roller 70a can be ensured, so that wear of the releasing layer 76a of the heat-uniformizing roller 70 can be prevented.

(4) Fixing Apparatus According to Third Embodiment

As described above, the heat pipe effective length $L_{HP}$ is a length of the heat pipe 72 effective in heat uniformization performance. In the first embodiment, the length of a region where the outer peripheral surface of the heat pipe 72 is in contact with the inner peripheral surface of the metal pipe (the roller main body) 71 is denoted by the heat pipe effective length $L_{HP}$ (see FIG. 6 and the like). Due to limitations to a manufacturing process of the heat pipe 72, both the ends of the heat pipe 72 are formed in tapered shapes. Accordingly, at both the ends of the heat pipe 72, a region of only the metal pipe 71 which is not in contact with the heat pipe 72 exists. This region has a smaller thermal conductivity than that of the region in the range of the heat pipe effective length $L_{HP}$ and thus is a region where the temperature of the fixing belt 80 is reduced, that is, a non-effective region.

In order to reduce the non-effective region, a method of increasing the thickness of this part of the metal pipe 71 to increase thermal capacitance may be considered. However, in this method, the heat pipe 72 cannot be inserted into the metal pipe 71.

Therefore, in the third embodiment, the same heat pipe 72 and the same metal pipe 71 as those of the first embodiment are used, and the shapes of the supporting members that are press-fitted to both the ends of the metal pipe 71 are developed to increase the heat pipe effective length $L_{HP}$.

Figures 10A, 10B, 10C:
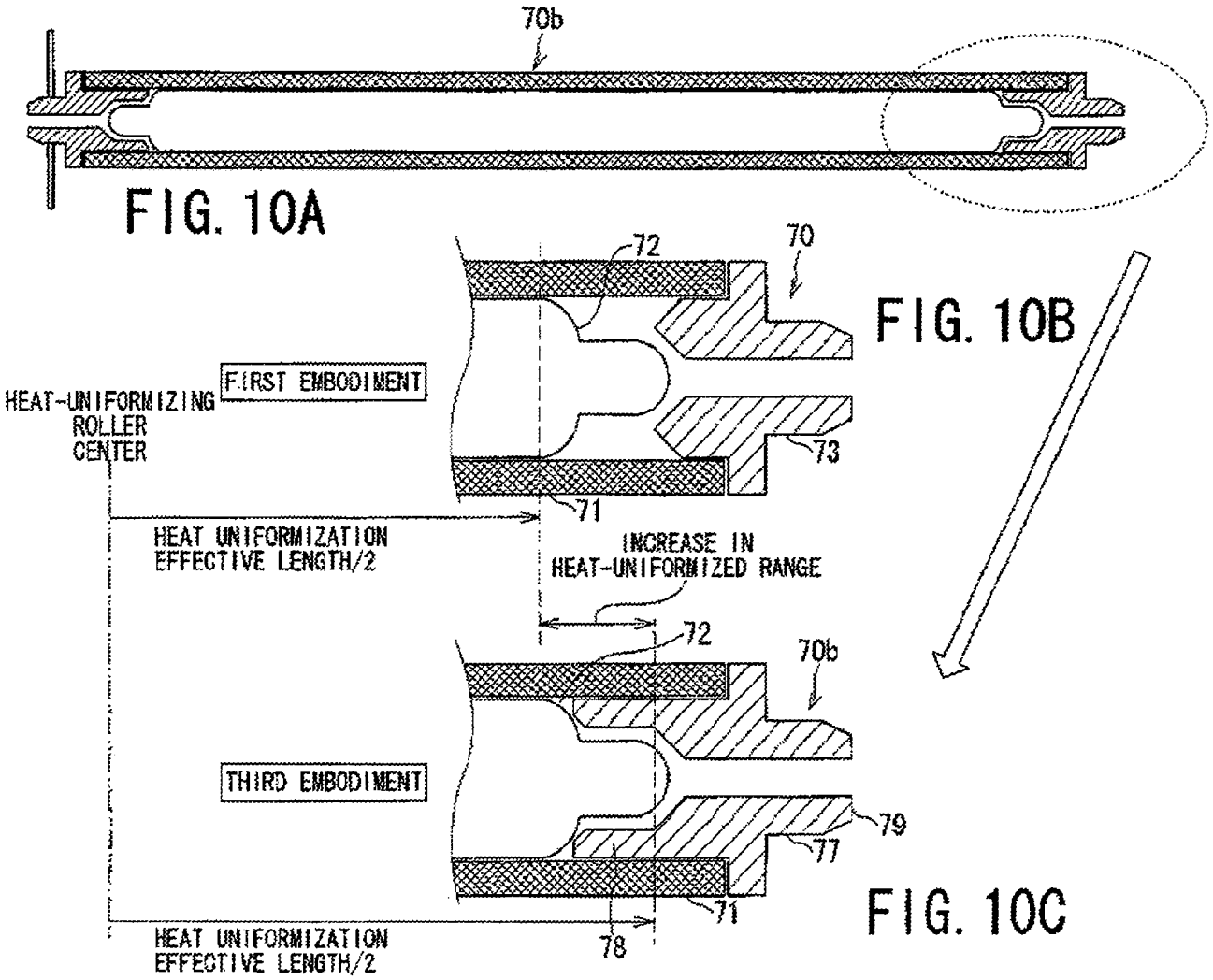
FIGS. 10A to 10C are explanatory views of a heat-uniformizing roller used for the fixing apparatus according to a third embodiment.

FIGS. 10A and 10C are diagrams illustrating an example of the structure of the heat-uniformizing roller 70b according to the third embodiment. FIG. 10B is a diagram illustrating an example of the structure of the heat-uniformizing roller 70 according to the first embodiment for the comparison.

In the third embodiment, as illustrated in FIG. 10C, the supporting member 77 blocks both an end of the metal pipe 71 that stores the heat pipe 72 while supporting the end of the metal pipe 71. The supporting member 77 includes a heat conductive member 78 that fills a space formed between the region of the heat pipe 72 having the tapered shape and, the inner surface of the metal pipe 71. The heat conductive member 78 may be made of the same material as that of the entire supporting member 77 and is made of metal having high thermal conductivity, such as, iron or aluminum.

In the third embodiment, spaces at both the ends of the heat pipe 72 of the first embodiment are filled with the heat conductive member 78 so as to come in contact with the inner surface of the metal pipe 71. As a result, the thickness of the metal pipe 71 that is in contact with the heat conductive member 78 can be increased in outer appearance, and thus the thermal capacitance can be practically increased. Accordingly, it is possible to prevent a reduction in the temperature of the fixing belt 80 passing through both the ends of the heat-uniformizing roller 70.

The supporting member 77 has a shaft portion 79 that supports both the ends of the heat-uniformizing roller 70b so as to be rotatable. The shape of the shaft portion 79 and a distance from the end face of the metal pipe 71 to a tip end of the shaft portion 79 are the same those of the first embodiment. Accordingly, the same shape or structure of a bearing portion that supports the heat-uniformizing roller 70b, or the same mechanisms near the heat-uniformizing roller 70b as those of the first embodiment can be used, and no changes are needed. In addition, as described above, the same heat pipe 72 and the same metal pipe 71 as those of the first embodiment are used. That is, in the third embodiment, the shape of only a part of the supporting member 77 is changed from the first embodiment. Accordingly, the temperature reduction in both the end portions of the heat-uniformizing roller 70b can be prevented with extremely low cost.

While certain embodiments have been described, these embodiments have been presented by way of example only, and are not intended to limit the scope of the invention. Indeed, the novel apparatuses and units described herein may be embodied in a variety of other forms; furthermore, various omissions, substitutions and changes in the form of the apparatuses and units described herein may be made without departing from the spirit of the invention. The accompanying claims and their equivalents are intended to cover such forms or modifications as would fall within the scope and spirit of the invention.

What is claimed is:

1. A fixing apparatus comprising:

a first roller;

a second roller that forms a nip between the second roller and the first roller and presses a sheet passing through the nip against the first roller;

a heater that heats at least one of the first roller and the second roller, the heater including a magnetic core and a coil for heating the first roller, wherein [a] *the* heating range of the heater extends along a longitudinal width of the coil [and] *which* is greater than a maximum printing width of a predetermined maximum sheet width, and a longitudinal width of the magnetic core is greater than the maximum printing width, and a heat-uniformizing member that distributes heat of the heater along a longitudinal direction [thereof] *of the heat-uniformizing member*, wherein an effective length of the heat-uniformizing member in the longitudinal direction is the same as, or greater than, the predetermined maximum sheet width, and is the same as, or greater than, a sum of a width of a first region and a width of a second region in a sheet width direction, the first region being a region where heat is lost by the sheet at the nip and the second region being a region where heat is not lost by the sheet at the nip.

2. The fixing apparatus according to claim 1, wherein, the longitudinal width of the coil is less than the sum of the width of the first region and the width of the second region in the sheet width direction.

[3. The fixing apparatus according to claim 1, wherein, the heater is a halogen lamp and is configured to heat the second roller.]

*4. The fixing apparatus according to claim 1, further comprising:*

*a third roller, and*

*a continuous belt extending over the third roller and over a first one of the first and second rollers, wherein the continuous belt contacts the second one of the first and second rollers at the nip.*

*5. The fixing apparatus according to claim 4, wherein the third roller is hollow, and the heat-uniformizing member is located within the third roller.*

*6. The fixing apparatus according to claim 4, wherein the third roller comprises opposed end portions at opposed ends of a middle portion thereof, and the diameter of the opposed end portions is smaller than the diameter of the middle portion.*

*7. A fixing apparatus comprising:*

*a first rotary member;*

*a second rotary member that forms a nip between the second rotary member and the first rotary member and presses a sheet passing through the nip against the first rotary member;*

*an energy source configured to heat at least one of the first rotary member and the second rotary member, wherein a heating range of the energy source extends in a width direction of the energy source and is greater in width than a maximum printing width of a predetermined maximum sheet width, and*

*a heat-uniformizing member that distributes heat of the energy source along a longitudinal direction of the heat-uniformizing member, wherein an effective length of the heat-uniformizing member in the longitudinal direction is the same as, or greater than, the predetermined maximum sheet width, and is the same as, or greater than a sum of a width of a first region and a width of a second region in a sheet width direction, the first region being a region where heat is lost by the sheet at the nip and the second region being a region where heat is not lost by the sheet at the nip.*

*8. The fixing apparatus of claim 7, wherein the energy source includes a magnetic core and a coil for heating the first rotary member.*

*9. The fixing apparatus according to claim 8, wherein the width of the magnetic core is greater than the maximum printing width.*

*10. The fixing apparatus of claim 7, further comprising:*

*a third rotary member; and*

*a continuous belt extending over the third rotary member and over a first one of the first and second rotary members, wherein the continuous belt contacts the second one of the first and second rotary members at the nip.*

*11. The fixing apparatus of claim 10, wherein the third rotary member is hollow and includes the heat-uniformizing member therein.*

*12. The fixing apparatus of claim 10, wherein the continuous belt comprises a conductive layer contacting the third rotary member.*

* * * * *